United States Patent [19]

Huang et al.

[11] Patent Number: 4,542,497
[45] Date of Patent: Sep. 17, 1985

[54] WIDEBAND DIGITAL SWITCHING NETWORK

[75] Inventors: Alan Huang, Ocean; Scott C. Knauer, Englishtown, both of N.J.

[73] Assignee: AT&T Bell Laboratories, Murray Hill, N.J.

[21] Appl. No.: 479,669

[22] Filed: Mar. 28, 1983

[51] Int. Cl.$^4$ .......................... H04Q 11/04; H04J 6/02
[52] U.S. Cl. ........................................... 370/60; 370/80
[58] Field of Search ...................... 370/60, 94, 56, 63, 370/58, 80; 179/18 FC; 358/89

[56] References Cited

U.S. PATENT DOCUMENTS

| | | | |
|---|---|---|---|
| 3,428,946 | 2/1969 | Batcher | 340/146.2 |
| 3,959,596 | 5/1976 | Bosanek et al. | 370/59 |
| 4,074,077 | 2/1978 | Charransol et al. | 370/58 |
| 4,123,624 | 10/1978 | Gagnier et al. | 370/58 |
| 4,251,880 | 2/1981 | Baugh et al. | 370/60 |
| 4,380,064 | 4/1983 | Ishikawa et al. | 370/59 |
| 4,392,223 | 7/1983 | Simmons et al. | 370/63 |

OTHER PUBLICATIONS

IEEE Transactions on Computers, vol. C-30, No. 5, May 1981, "A Self-Routing Benes Network and Parallel Permutation Algorithms," pp. 332-340.
Spring Joint Computer Conference Proceedings, 1968, "Sorting Networks and Their Applications", K. E. Batcher, pp. 307-314.
IEEE Transactions on Computers, vol. C-24, No. 12, Dec. 1975, "Access and Alignment of Data in an Array Processor", D. H. Lawrie, pp. 1145-1155.
IEEE Transactions on Communications, vol. COM-29, No. 6, Jun. 1961, "Integrated Broad Bandwidth Communication Using Optical Network—Results of an Experimental Study" H. J. Matt, pp. 868-885.

Primary Examiner—Douglas W. Olms
Assistant Examiner—Frank M. Scutch, III
Attorney, Agent, or Firm—Henry T. Brendzel

[57] ABSTRACT

Disclosed is a wide bandwidth self-routing switch. One-to-one, one-to-many, and many-to-many modes of communications are achieved with time multiplexed signal packets of multi-service users with a system having a bank of demultiplexers which demultiplex incoming signals and supply them to a broadcast network. The broadcast network includes a concentrator, a "sort on source" sorting network and a copy network. The concentrator permits a reduction in subsequent processing by segregating the incoming lines which carry active signals. The "sort on source" sorting network places all blank copy packets (which are destined to users that wish to tune to a broadcaster) adjacent to the broadcaster's signal packets. The copy network copies the information in the broadcaster's signal packets into the packets destined to the users. The blank copy packets are continually generated by the users wishing to receive broadcasts or, alternatively, by a blank packet generator.

Signal packets exiting the broadcast network enter a wide bandwidth switch which includes a "sort on destination" sorting network and an expander. The "sort on destination" sorting network arranges the packets in the order of their destination addresses and the expander routes the sorted packets to the desired destinations. The output signals of the expander are time multiplexed and the multiplexed packets are sent to the users.

11 Claims, 13 Drawing Figures

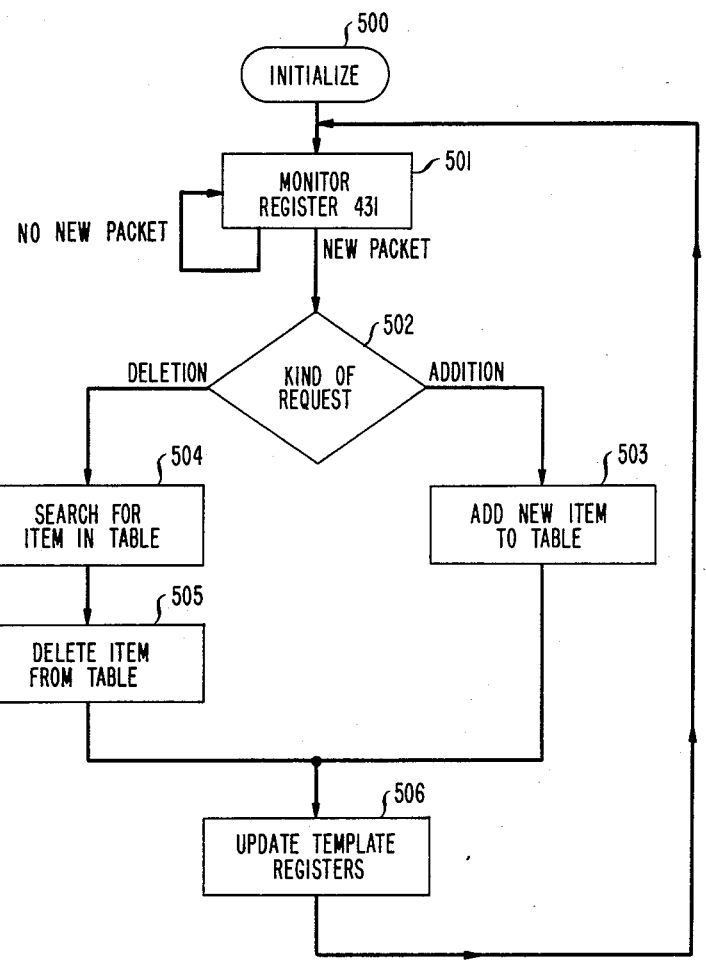

WIDEBAND DIGITAL SWITCHING NETWORK

TECHNICAL FIELD

This invention relates to communications networks generally and, more particularly, to wideband digital switching networks.

BACKGROUND OF THE INVENTION

With the burgeoning of electronic technologies, the demand for a wider variety of communications services has been steadily rising. New technologies have been continually developing to meet these demands including lasers, fiber optics, microprocessors, and very large scale integrated circuits. While many alternative approaches for realizing the new communications services are available, digital data transmission seems to be the one best equipped for future progress and, accordingly, it is currently receiving the most attention.

In terms of the services to be offered, it is expected that, in addition to standard telephone services, a host of low, medium and wide bandwidth services would be introduced. This would include electronic mail, facsimile, high-fidelity audio, computerized data base searches (e.g., want ads, encyclopedia, travel arrangements, etc.), remote shopping, electronic banking and home computer networks. Business users would also use electronic blackboards, teleconference facilities, word processors, and large computer communication networks.

To realize a communications system that can efficiently support such a rich menu of services one must consider the nature of the signals flowing through the system and the demands that these signals place thereon.

It is clear, for example, that at least for some of the services wide bandwidth capability is required of the transmission medium and of the switching equipment.

It is also clear that the signals of such services are of diverse nature. For example, some of the services are characterized by bursty signals (e.g., computer data streams) while others are characterized by continuous signals (e.g., video). Whereas delays or interruptions in bursty signals are often acceptable, substantial delays of continuous signals are unacceptable and interruptions are very difficult to patch. Accordingly, different hardware capabilities are suitable for bursty and continuous signals.

Different signal interactions between users also call for different hardware capabilities. Conventional telephone conversations are one-to-one communications, requiring low bandwidth and two way transmission. Services that provide information, such as time and weather, are one-to-many communications, requiring broadcast capability but only one way transmission. A third mode of communications, many-to-many, results when a user subscribes to a number of services and simultaneously employs those services to communicate with several other users (such as listening on the telephone while receiving electronic mail). These different modes of communication require different capabilities from a communications system.

Closely tied to the above considerations is the per user capacity that is made available. The effects of per user capacity considerations manifest themselves both in the switch and the transmission channels interactions.

With respect to the switch, since some of the new services will require a wide bandwidth, the switch will have to possess wide bandwidth capabilities. However, most switches that offer wide bandwidth capability underutilize this bandwidth when signals of low bandwidth are transmitted. That represents a wasted resource. To minimize waste with the myriad of services that are expected to be offered, the switch employed has to inherently be capable of wide bandwidth switching, and yet offer to the users only the bandwidth they need (or wish to pay for) so that bandwidth unused by one user can be offered to another user.

As for the transmission channel interactions, one of the more economical methods of connecting the switch to customers who send and receive a number of services (many-to-many) is via single cables having the several signals multiplexed thereon. One of the main problems with this approach, however, is the difficulty in coordinating the transmissions between two or more sources and a common receiver. Conventionally, the receiver's capacity is partitioned into time slots which can be allocated among the transmitters but, unfortunately, this situation is blocking. A transmitter might not be able to communicate with a particular receiver because it might have previously committed to another receiver the time slots which this particular receiver has available. So, while the receiver and the transmitter might have the necessary bandwidth, communication would not be possible.

In summary, it is desirable to have a switch that is capable of switching signals in a wide range of bandwidths, of economically utilizing its wideband resources to switch lower bandwidth signals, handling bursty as well as continuous signals, and of efficiently establishing one-to-one, one-to-many, and many-to-many modes of communication without blocking.

DESCRIPTION OF THE PRIOR ART

Wideband telecommunication applications are mostly found in connection with digital data transmission between computers. While this data requires wide bandwidth, it is bursty in nature, requiring a very short time interval for transmission of the desired information. Because of its bursty format, the nature of this communication is not similar to conventional voice communication in the telephone network. Consequently, most computer networks are not suitable for continuous communication.

The systems described below, which are suitable to both voice and data communications are representative of the art that is relevant to this invention.

C. R. Baugh et al, in U.S. Pat. No. 4,251,880, dated Feb. 17, 1981, describe a system for handling both bursty and continuous data. Their system employs a single digital loop with data interchangers which transfer the data to and from the loop. A central controller is serially interposed in the digital loop and serves to assign time slots for the information exchange between various programmable data interchangers. The controller, in cooperation with the data interchangers, varies the size of the field of each frame so that the portion of the field associated with continuous communication expands and contracts as traffic flow changes, thereby increasing or decreasing the number of time slots available for bursty data. The Baugh system is fairly robust but, being a loop system, it is inherently limited in the number of users and per-user bandwidth it can handle.

H. J. Matt et al published an article in the IEEE Transactions on Communications, Volume COM-29 Number 6, June 1961, pp. 868–885, entitled "Integrated Broad Bandwidth Communication Using Optical Network—Results of an Experimental Study". They describe a fairly comprehensive system for broad bandwidth communication, using 560 M bits/sec transmission facilities. Basically, it is a duplex TDM system where local loops are attached to trunks and a number of users are connected to each loop. To a limited extent, the users within each loop can communicate with each other and protocol is described for connecting to users on other local loops through the trunks. The limitations of this system, like the limitations of the Baugh system, stem from the fact that it is basically a loop system.

Trying to overcome the limitations of prior art systems, it is a central object of this invention to realize a wideband communication system that can efficiently support a wide variety of services with diverse signal and interaction characteristics.

SUMMARY OF THE INVENTION

This and other objects and advantages are attained, in accordance with the principles of our invention, with a wide bandwidth self-routing switch arrangement which handles signal packets that have accompanying address information.

In an embodiment which realizes one-to-one, one-to-many, and many-to-many modes of communications, signal packets destined to multi-service users are time multiplexed onto wide bandwidth transmission channels and similarly demultiplexed at the switch. The demultiplexed signal packets are applied to a broadcast network which includes a concentrator, a "sort on source" sorting network, a copy network and, optionally, a blank copy packet generator. The concentrator permits a reduction in subsequent processing by segregating from the set of incoming lines and the set of lines from the copy packet source those lines which do not carry active signals or are unused. The users who wish copies of a broadcast transmit self-addressed (addresses) blank copy packets with the source address subfield holding the address of the targeted broadcaster. Alternatively, the blank copy packet source generates the blank packets at the receiver's or broadcaster's command. The "sort on source" sorting network places all blank copy packets (which are addressed to the users that wish to tune to a broadcaster) adjacent to the broadcaster's signal packets. The copy network copies the information in the data field of the broadcaster's signal packets into the data field at the copy packets addressed to the users.

Signal packets exiting the broadcast network enter a wide bandwidth switch which includes a "sort on destination" sorting network and an expander. The "sort on destination" sorting network arranges the packets in the order of their destination addresses and the expander routes the sorted packets to the desired destinations. The output signals of the expander are time multiplexed, as stated above, and the multiplexed packets are sent to the users.

BRIEF DESCRIPTION OF THE DRAWING

FIG. 12 is a flow chart of the computational process within processor 432; and

DETAILED DESCRIPTION

Many-to-Many Communications—Overview

Figure 1:
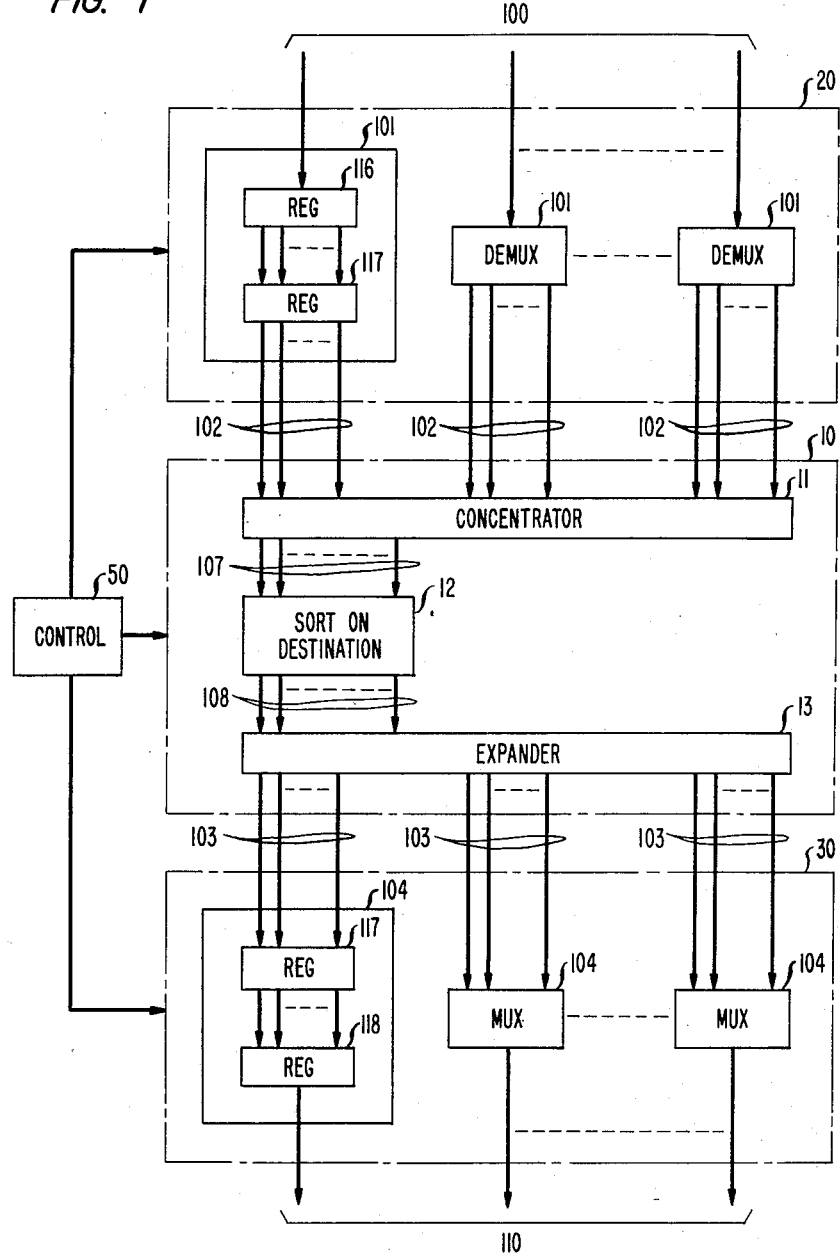
FIG. 1 depicts a block diagram of a switching system adapted for one-to-one, and many-to-many modes of communication where the information is transmitted in packets whose headers, contain the information required to route the packets.

FIG. 1 depicts a wideband switching system that is capable of handling one-to-one and many-to-many modes of communications, without blocking, for any signal transmission approach which has a destination address accompanying the data. A one-to-one mode of communication occurs when a single terminal is communicating with another single terminal, and a many-to-many mode of communication occurs when many terminals (from one or many users) are communicating with a user having many terminals.

The need of an accompanying destination address is a requirement of the FIG. 1 system that is extremely mild since even conventional telephone signals can be thought of as comprising a destination address and an accompanying (very long) burst of data. For purposes of this disclosure, the system of FIG. 1 is described in the context of the familiar packet switching arrangement where data flows between users in relatively small packets of information. The format of packets depicted in FIG. 2, which is suitable for the system of FIG. 1 and for the system of FIG. 6, described infra, contains a data field and header which includes an activity bit and an address field. The activity bit, when it is a "0", indicates that the packet carries valid data. The address field contains a destination address subfield, a source address subfield, and possibly additional subfields. Each subfield carries its information with the most significant bits first. The data field, of course, contains the information to be communicated.

As stated earlier, in the many-to-many mode of communications each user has several input and output channels. These channels are traditionally established via time slots on a time division multiplexed transmission line connected to each user; and each time slot, repeating at a predetermined rate, is dedicated to a particular service subscribed to by the customer. The difficulty with this method of communicating with a multi-service customer, as mentioned earlier, is that a sender's available time slots might not coincide with a receiver's available time slot. As a result it might not be possible to directly connect the output channel of one customer to the input channel of another customer.

This problem can be partially resolved by using a time slot interchanger to rearrange the time slots and by applying the rearranged signals to a non-blocking space division switch, such as a crossbar. Unfortunately, this approach can still be blocking.

We observed that the blocking problem can be avoided by mapping the time switching process, which is followed by the spatial switching process, into a single larger spatial switching process. This is accomplished by demultiplexing the time slot signals of the time division multiplexed transmission line and by simultaneously applying, in parallel, the signals of all time slots (i.e., signal channels) to a non-blocking spatial switch. This approach initially seems impractical since many buffers would be needed to store the time slots, and the spatial switch would need to be considerably larger (more input ports). We noticed, however, that the need for input time slot buffers can be avoided by bitwise interweaving of the time slot data, and the size of the spatial switch can be reduced by employing concentration stages and by exploiting various hardware tradeoffs that allow a high speed small network to simulate the function of a slower, larger one.

The question remained as to what is the optimum bandwidth of the signal channels. Since users can change the services to which they subscribe and the different service-providing terminals require different bandwidths, one approach would require the switch to be capable of handling the widest bandwidth of any service-providing terminal. This is wasteful of switch capabilities for most of the user terminals. Also, it is limiting on the availability of future services.

The solution that we are employing in connection with our invention is to divide all signals of the service-providing terminals into channels of a convenient bandwidth, and to simultaneously apply the bandwidth limited signals to a non-blocking space division switch that introduces uniform delay to all applied signals. Channels are addressed independently, are routed independently, and are combined, as necessary, to reform the original signals. This approach permits the channel bandwidth to be chosen small enough to not unreasonably waste bandwidth on low data rate signals, but wide enough to not divide high data rate signals into too many channels. Also, this approach permits the customer to specify the total bandwidth that he wishes to have and pay for and provides the owner of the switch with a switching fabric that can grow modularly with increasing demand.

Many-to-Many Communications—FIG. 1

The principles of our invention are realized with a system as shown in FIG. 1, wherein lines 100 are the incoming signal lines, carrying signals from users, and lines 110 are the outgoing signal lines, carrying signals to users. The number of lines 100 and 110 is not necessarily the same. Lines 100 and 110 are wide bandwidth transmission lines which are capable of carrying time multiplexed signal packets to and from each user. At the user's end, the time multiplexed signal packets interact with a plurality of service-providing equipment.

The time multiplexed signals of each line 100 are demultiplexed into channels of preselected bandwidth within demultiplexer block 20 by demultiplexers 101, and the demultiplexed signals are applied to wideband packet switch 10 via lines 102. Switch 10 routes the applied packets to appropriate switch output lines 103 and the routed signal packets on lines 103 are multiplexed within multiplexer block 30 by multiplexers 104 and applied to outgoing signal lines 110. Elements 10, 20 and 30 are controlled by block 50.

Demultiplexer 101—Multiplexer 104

The operation of both demultiplexer 101 and multiplexer 104 is dictated by the interweaving of the signal bits of the packets flowing in lines 100 and 110. Each demultiplexer 101 may be realized with a shift register 116 to serially accept the high rate data stream of its input line 100 and a register 117 to buffer the parallel output of register 116. Conversely, each multiplexer 104 may be realized with register 117 to buffer the signals of its lines 103 and a shift register 118 for shifting the buffered signals onto its line 110.

Wideband Switch 10

Switch 10 of FIG. 1 comprises a concentrator 11 responsive to input signals on lines 102, a "sort on destination" sorting network 12 responsive to concentrator 11, and an expander network 13 responsive to sorting network 12. Switch 10 is described in great detail in our copending patent application entitled "A Self-Routing Switching Network", filed concurrently with the instant application. That application is hereby incorporated by reference. To enhance readability of this disclosure, however, the following describes switch 10 in sufficient detail to enable a person in the art to understand, make and use switch 10.

Concentrator 11 groups the lines that carry active signal packets, in order to reduce the number of lines that must be considered by the remaining elements of switch 10. That is, concentrator 11 permits the number of lines 107 to be considerably smaller than the number of lines 102 without incurring an appreciable likelihood that a signal on some line 102 will find all lines 107 occupied. Of course, concentrator 11 may be dispensed with when cost and switch usage considerations reduce the economic advantage gained in using the concentrator.

Concentration is realized by identifying the presence of active packets on lines 102, with the required information for the identification obtained from the activity bits. Having identified the active packets, concentrator 11 routes the active packets to its output lines 107, starting with the left-most line 107 in FIG. 1, to close the gaps in the sequence of lines that carry active packets. All active packets are thus placed adjacent to each other at lines 107 starting with the left-most line 107, and all inactive packets (if any) are placed adjacent to each other starting, in effect, with the right-most line 107.

It is important for concentrator 11 to implement the routing of packets simultaneously so that a minimum of delay is introduced. A number of embodiments of concentrator 11 that can realize simultaneous routing and minimal delay are described in S. Knauer's copending application entitled "A Self-Routing Steering Network", which was also filed on even date herewith and is incorporated herein by reference.

Figure 3:
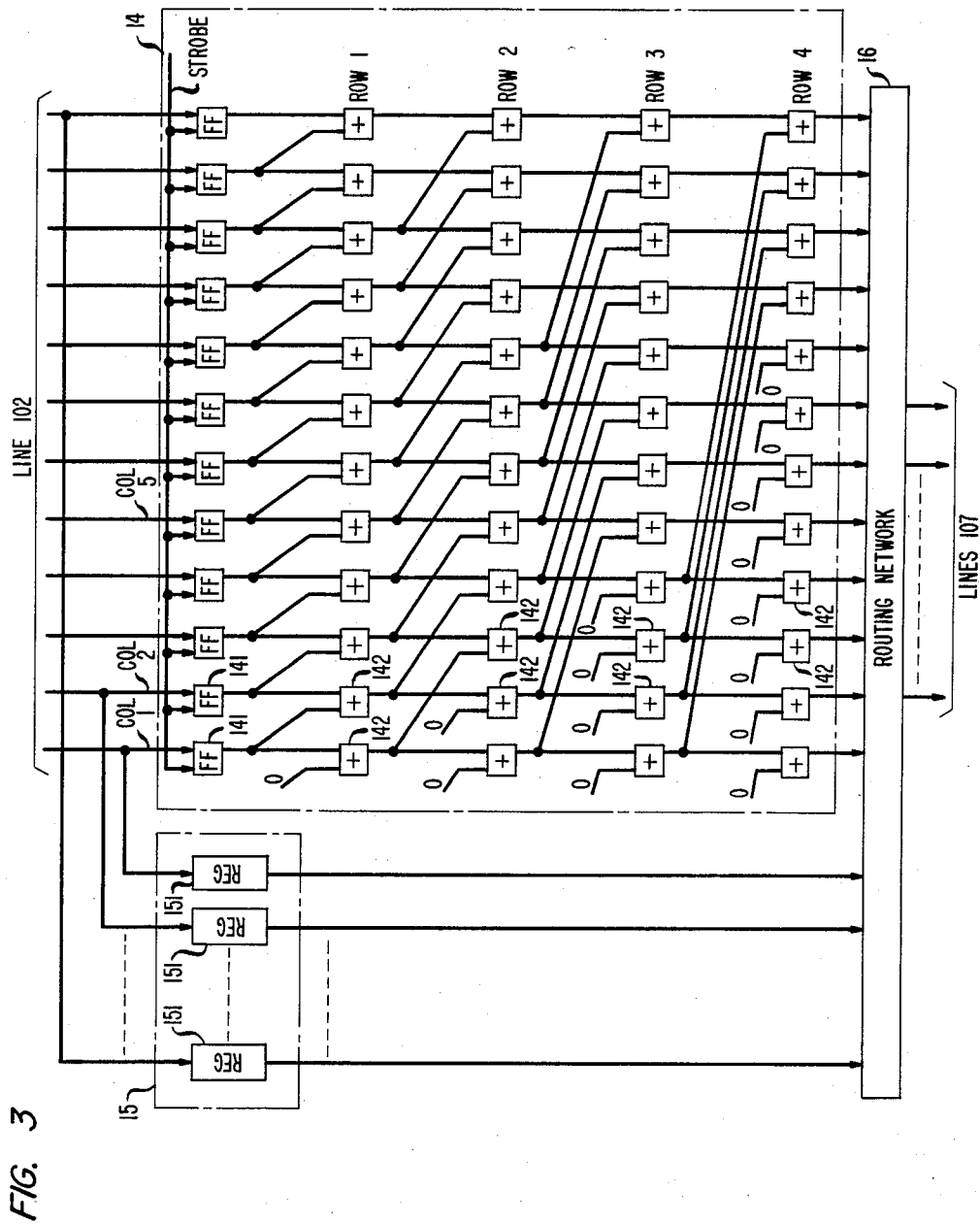
FIG. 3 presents an illustrative embodiment of concentrator 11.

One specific embodiment, whose block diagram is shown in FIG. 3, includes an adder network 14 and a delay network 15, both connected to lines 102, and a routing network 16 connected to both adder network 14 and delay network 15. Adder network 14 is constructed from a row of flip-flops 141 that capture the activity bits and an array of adder circuits 142 that are interconnected to provide an "idle lines sum" signal for each input line 102. Each "idle lines sum" signal indicates the number of idle lines 102 (lines with inactive packets) between that corresponding line 102 and a selected first line 102 (e. g., the left-most line 102 in FIG. 3). Network 15 delays the signal packets of lines 102 with registers 151 by an amount equal to the delay within adder network 14, thereby allowing the "idle lines sum" signals of adder network 14 to enter routing network 16 in synchronism with the signal packets entering routing network 16 from delay network 15.

Figure 4:
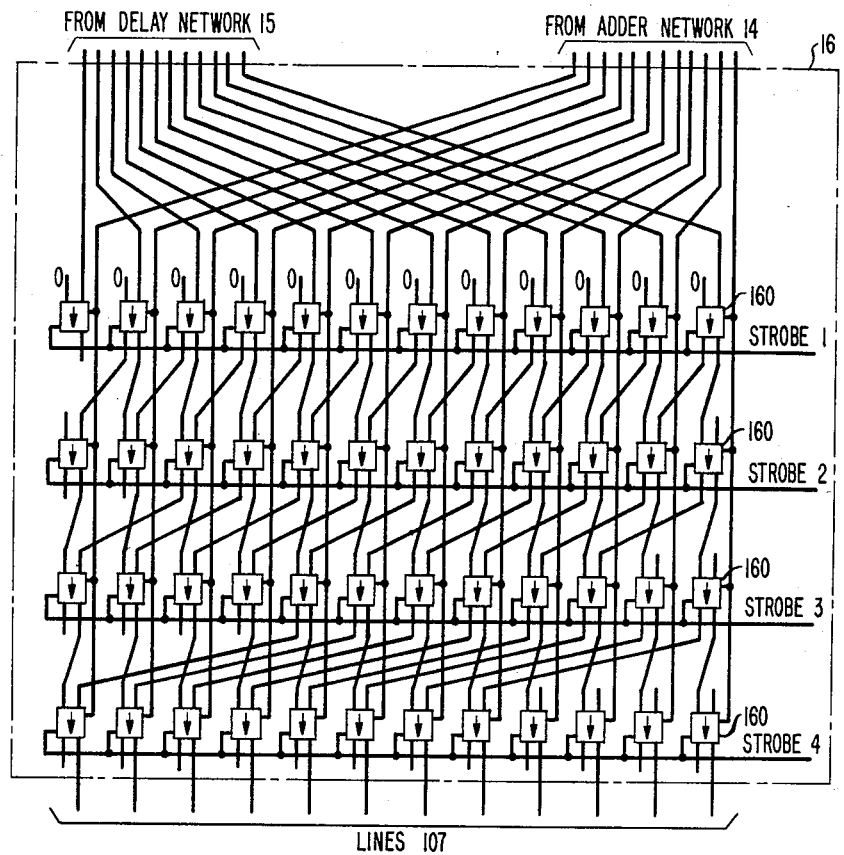
FIG. 4 presents an illustrative embodiment of routing network 16 within concentrator 11.

Routing network 16, shown in greater detail in FIG. 4, is a shift network. It comprises an array of switching elements 160 which route the signal packets supplied by delay network 15 to output lines 107, under control of the "idle line sum" signals supplied by adder network 14. Under control of a strobe signal, each element 160 captures the appropriate control bit off the line emanating from network 14 and, based on the captured control bit, switches its input signal to one or the other of its two output terminals. For example, when a particular signal line has an associated "idle line sum" equal to 10, represented by the binary number 1010, the first row captures the least significant control bit (0) and transfers the signal unshifted, the second row captures the next control bit (1) and shifts the signal 2 positions to the left, the third row captures the following control bit (0) and transfers the signal unshifted, and the fourth row captures the last control bit (1) and shifts the signal 8 positions to the left. What is achieved is a shift to the left of 10 positions, as required.

"Sort on destination" sorting network 12 (FIG. 1), as the name implies, sorts the incoming signal packets of lines 107 based on the destination of those packets and delivers a sorted set of packets to lines 108. The sorting process arranges the signals so that at lines 108 all signal packets situated to one side of any selected signal packet have a higher or equal destination address, and all signal packets situated to the other side of the selected signal packet have a lower or equal destination address.

Sorting network 12 can be implemented with a conventional network as described by K. E. Batcher in U.S. Pat. No. 3,428,946 issued Feb. 18, 1969 and in a paper entitled "Sorting Networks and their Applications", published in the 1968 Spring Joint Computer Conference Proceedings, pp. 307–314. Another implementation of sorting network 12 is described in detail in our aforementioned application.

Figure 5:
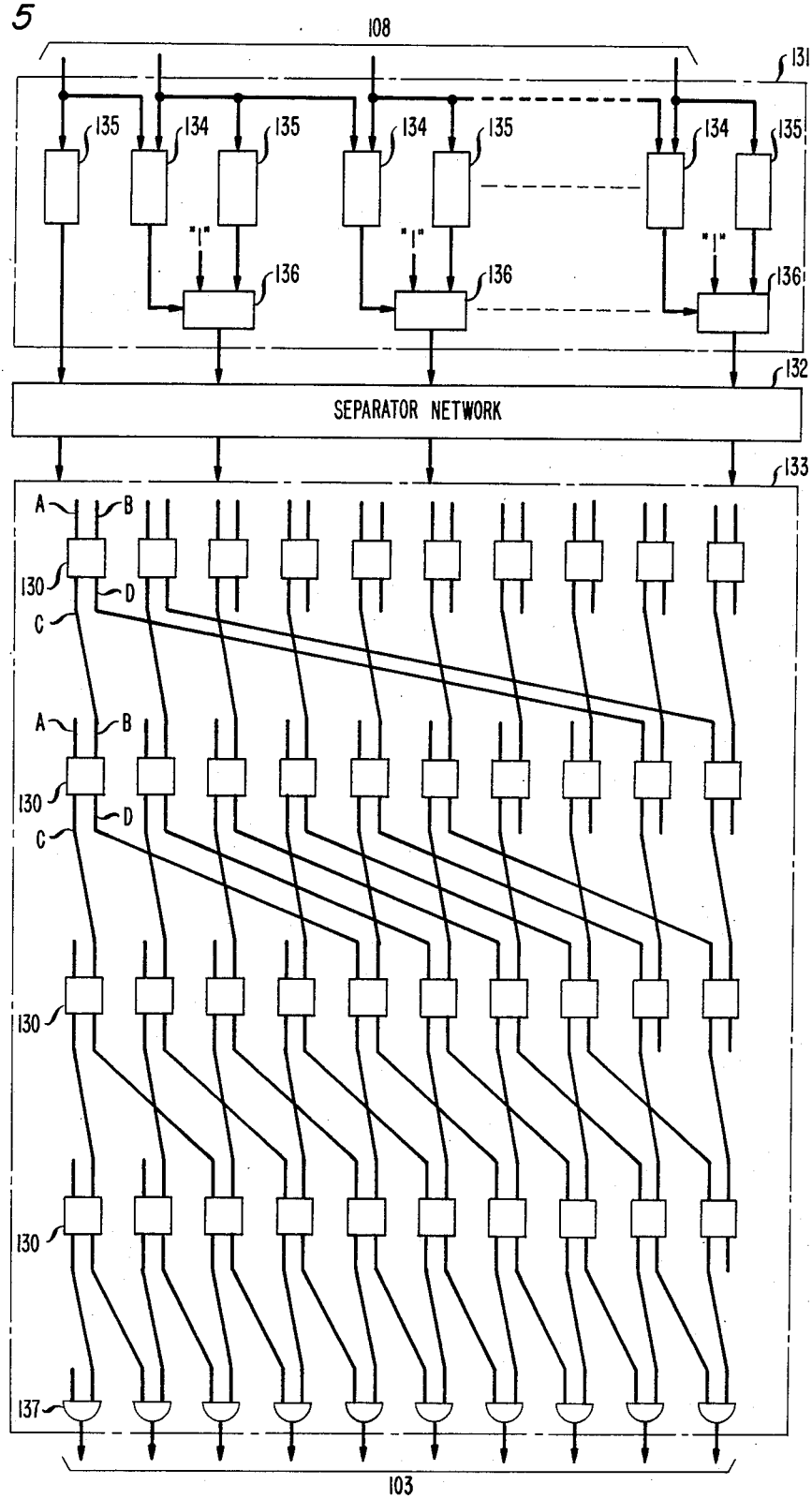
FIG. 5 illustrates one embodiment of expander 13.

Expander 13 routes the sorted set of packets at lines 108 to the actual destination addresses of the packets. As described in our aforementioned copending application, a number of implementations are available for realizing the function of expander 13 in accord with the principles of our invention. One such implementation, shown in FIG. 5, comprises a trap network 131, a separation network 132 and a routing network 133.

Trap network 131 detects the presence of packets that seek a common destination and deactivates all but one of them. In applications where at any one time only one packet can seek connection to a particular destination, networks 131 and 132 are not needed for proper operation of the expander.

For each incoming line 108, network 131 includes a comparator 134, a delay register 135 and a selector 136. Comparator 134 compares the destination address of the signal at its associated input line 108 to the destination address of the signal at line 108 to its immediate left. Delay register 135 provides a delay to account for the delay in comparator 134. In the implementation shown, selector 136 transfers a continuous "1" to its output (in place of the delayed signal) whenever the destination address on the line is equal to the destination address on the line on the left. In another implementation, selector 136 can set a "trap" flag in the header to indicate that the packet is a "repeat".

Separation network 132 segregates the inactive packets (streams of continuous "1"s) generated by comparison network 131. By using the initial "1" in the stream of "1"s as the activity bit, network 132 can be implemented with a concentrator 11 network. A network like sorting network 12 can also be employed as a separation network. In the alternate implementation mentioned above, the trap flag has the function of the activity bit.

Routing network 133 comprises two-input (A and B) and two-output (C and D) switch elements 130 that are interconnected in an array of rows i and columns j, followed by a row of AND gates 137. The B inputs of the top row of elements 130 are connected to the outputs of the separator network. The A inputs of these elements are connected to logical zero. The interconnection of the remaining switch elements 130 follows the pattern $B_{i,j} = C_{i+1,j}$ and $A_{i,j} = D_{i+1,j-k}$ where $k=2^i$; the rows i, where i=1,2,3, . . . , are counted from the lowest row of elements 130 upwards; and the columns, j, where j=1,2,3, . . . , are counted from left to right (in FIG. 5). The equations define connections as long as the subscripts are greater than zero, i≦M and j≦N, where M is the number of rows and N is the number of columns. Connection to signal ports that are not defined by the above equations are connections to zero.

Gates 137 are two input AND gates that are connected to the bottom row of elements 130. A gate in column m is connected to output D of element 130 in column m−1 and to output C of element 130 in column m.

In proper expander operation only one input, A or B, should be active in the same packet time, and each switch element 130 accepts the active packet. If both inputs are inactive, both outputs are set to "1" (inactive) for that packet time. The destination address of the accepted packet is compared to a fixed threshold address and, based on the comparison results, the packet is routed to either output C or output D. The fixed threshold address of each switch element 130 is related to its position within the array, and it is equal to $2^{i-1}+j-1$. Whenever the destination address is equal to or smaller than the fixed address, the accepted packet is transferred to output C. Otherwise, it is transferred to output D.

Implementation of switch elements 130 can follow conventional design approaches with the use of read only memories to store the fixed threshold address, gates and flip-flops to do the comparing, a flip-flop to store the switching selection and additional gates to do the switching.

One-to-Many Communications—Overview

The basic principle of our invention for realizing one-to-many communications, which we call broadcasting, is one of data copying. In order to broadcast to many users, packets must be generated that are addressed to the users wishing to tune to the broadcast, and those packets must contain the broadcasted information. With "intelligent" broadcasters, that is relatively straight forward. Either on its own initiative or in response to a single packet of information from the user, the broadcaster can generate packets with the requested destination addresses and place copies of its information in the data fields of the generated packets. One advantage of such broadcaster controlled copying is the ease with which billing for broadcast receptions can be achieved. The disadvantage is the difficulty in dynamically allocating the ports of switch 10 among the various broadcasters.

With broadcasters that are not "intelligent", the problem of copying is more complex because the receivers rather than the broadcasters must maintain control over the generation of packets, addressed to themselves, which carry the desired broadcaster's information. Port allocation to broadcasters, however, is not a problem.

Figure 6:
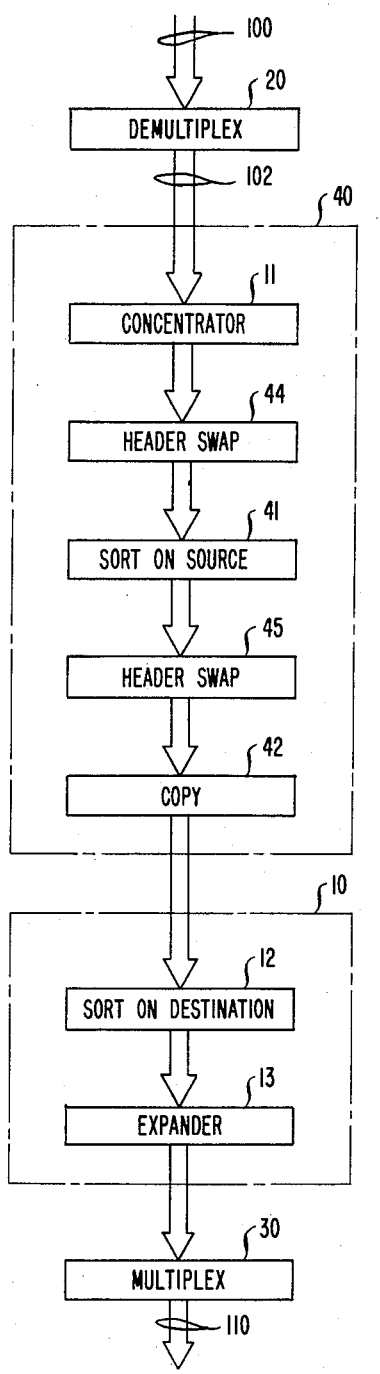
FIG. 6 depicts a block diagram of a switching system adapted for one-to-one, many-to-many and one-to-many modes of communictions.

One-to-Many Communications—FIG. 6

FIG. 6 depicts a wideband switching system that is adapted to one-to-one, many-to-many, and one-to-many (receiver controlled) modes of communications. Like the FIG. 1 system, it includes a demultiplexer block 20, a wideband switch 10 and a multiplexer block 30 connected to the output signals of switch 10. Blocks 10, 20 and 30 handle the one-to-one and many-to-many modes of operation, as described earlier.

Figure 2:
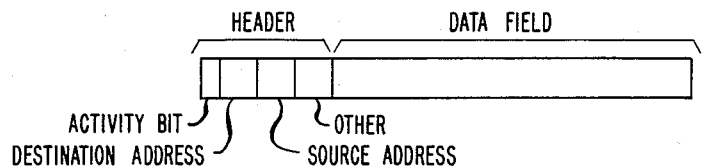
FIG. 2 illustrates the format of signal packets, as employed in this disclosure.

The system of FIG. 6 differs from the FIG. 1 system in that switch 10 does not include a concentrator 11, and a broadcast network 40 is interposed between multiplexer block 20 and switch 10. Also, the system of FIG. 6 requires a source address subfield in the address field of each signal packet. That address subfield is shown in FIG. 2 to follow the destination address subfield.

In general terms, the system of FIG. 6 operates in the following manner. A receiver that wishes to tune to a particular broadcaster causes "blank packets" to be sent to switch 10 which have the receiver's own address in the destination subfield and the broadcaster's address in the source subfield. These packets can be likened to self-addressed empty envelopes. At the same time, a broadcaster sends packets which have the broadcaster's own address in the source subfield and the destination address of the first user to request the program or to itself (e.g., to monitor its performance) in the destination address subfield. The packets are sorted by source, to place the blank packets adjacent to the broadcaster's packet, the data field of the broadcaster's packet is copied into the blank packets, and the no longer blank packets are forwarded to their destinations. This operation can be likened to stuffing of the empty self-addressed envelopes and mailing them to their destinations. Copying of the broadcaster packets information into the blank copy packets is achieved with the aid of a broadcast bit which is included in all packets. The broadcast bit ("1" for blank, "0" for original) follows the least significant bit in the source address subfield and forms a part of the source address subfield.

Figure 9:
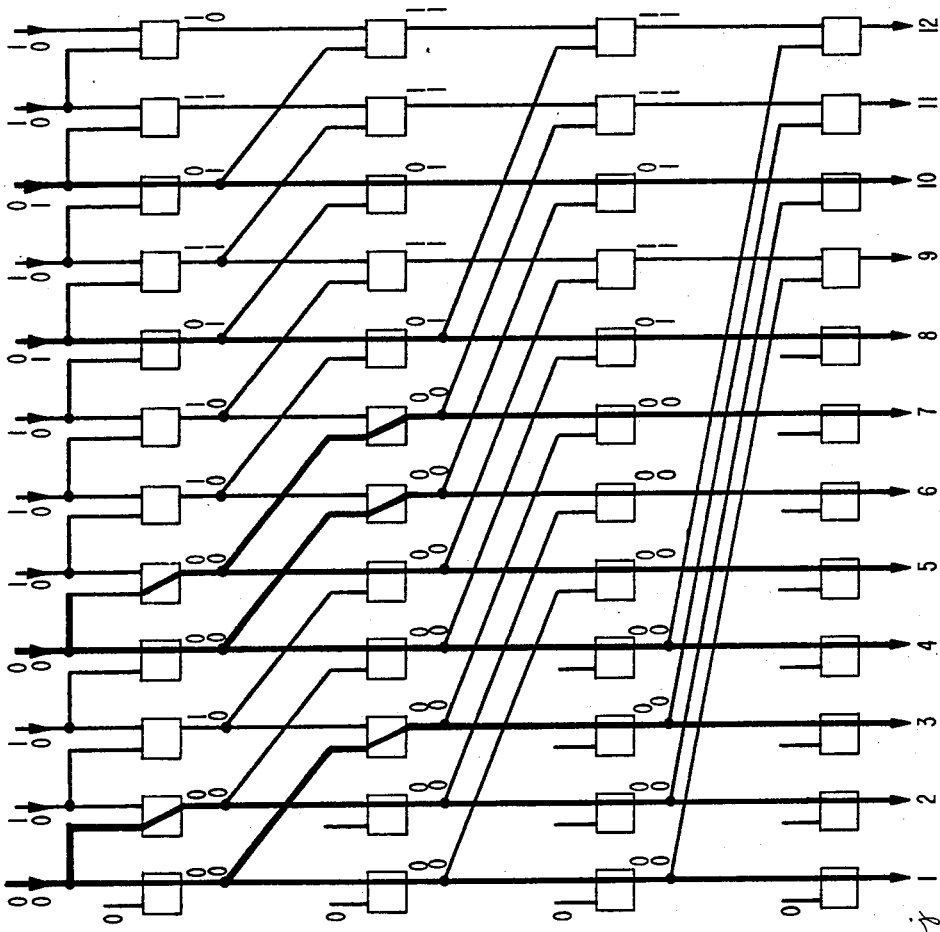
FIG. 9 illustrates the signal flow within copy network 42 in response to specific input signals.

Many refinements can be incorporated into the basic broadcasting scheme and, generally, they can easily be accommodated by including additional information in the address field. By way of example, we incorporate in the system described below the ability for users to withhold permission for others to copy their signal packets. This is achieved by introducing a copy permission bit following the broadcast bit which permits (0) or prohibits (1) copying. As shown by the table below, the broadcast bit and the copy permission bit combine to specify all input conditions, including the condition of a blank packet which seeks to copy an original packet that wishes not to be copied. As will be shown in connection with FIG. 9, in some implementations such a blank packet must not only be stopped from copying the packet it seeks to copy but must also be stopped from copying other packets.

| broadcast bit | copy permission bit | condition |
|---|---|---|
| 0 | 0 | copyable packet |
| 0 | 1 | non-copyable packet |
| 1 | 0 | blank packet |
| 1 | 1 | blank packet that tried to copy a non-copyable packet |

Of course, user privacy can be achieved in other ways, such as including in the broadcaster's source field a code unknown to the user. To copy and receive the material, the user would have to "call" the broadcaster and get the code.

Broadcast Network 40

To perform the tasks involved in creating packets with copies of the broadcaster's data, network 40 in FIG. 6 includes a concentrator 11 connected to lines 102, a "header swap" memory 44 responsive to concentrator 11, a "sort on source" sorting network 41 responsive to memory 44, a header swap memory 45 connected to sorting network 41, and copy network 42 responsive to memory 45.

Concentrator 11 is the same concentrator 11 that was described in connection with the FIG. 1 system. In the FIG. 6 system, the output of concentrator 11 is a collection of lines carrying private user packets, lines carrying broadcaster packets, lines carrying blank copy packets, and lines carrying inactive packets.

Since network 41 sorts on the source address it is beneficial to have the source address subfield (including the broadcast bit and the copy permission bit) immediately follow the activity bit rather than follow the destination address subfield. Header swap memory 44 accomplishes this task with a circuit associated with each line which includes a shift register memory and a two input selector connected to the register's input and output. Normally, the selector chooses the signal path through the memory. When the destination address subfield is in the shift register, the selector chooses the path not through the memory, passes the source address subfield to its output and reverts back to the path through the memory. This reverses the relative positions of the source address and the destination address subfields.

Sorting network 41 sorts on the source address subfield and consequently places all blank copy packets that seek to copy a certain source adjacent to that source's packet. When the broadcast bit is used as part of the source address (e.g., as the least significant bit of the source address), the sorting by network 41 places the broadcaster packet to the left of all the packets that wish to copy it. This is useful in reducing the computational burden on copy network 42.

Sorting network 41, like sorting network 12 in FIG. 1, can be implemented as taught by Batcher in the aforementioned publications.

Header swap memory 45, like memory 44, reverses the relative positions of the source address and the destination address subfields. Memory 45, in effect, nullifies the actions of memory 44.

Network 42 places the information in the data field of broadcast packets into the data fields of all adjacent blank copy packets that seek to copy that information and sends the no longer blank copy packets to switch 10.

Figure 7:
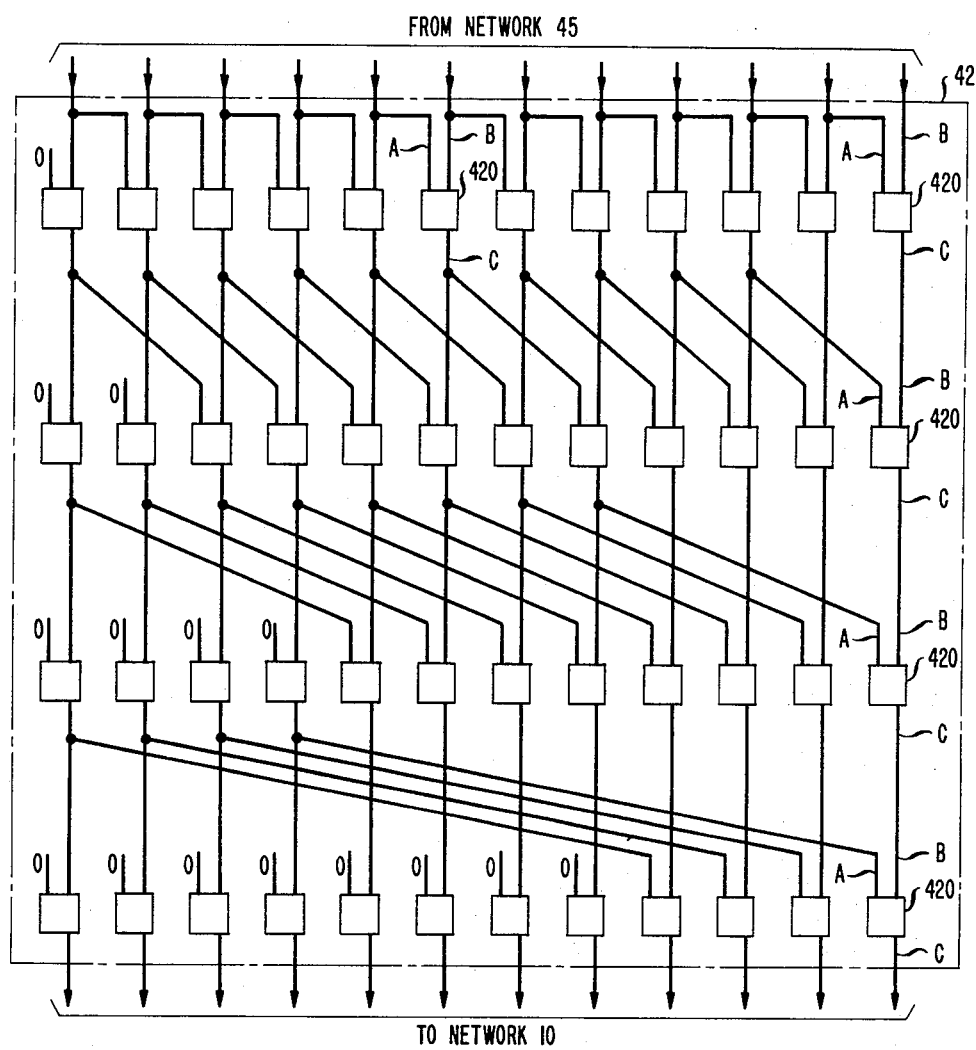
FIG. 7 details one realization of copy network 42.

Like concentrator 13, network 42 can be realized in a number of ways. The illustrative implementation shown in FIG. 7 comprises an array (rows and columns) of switchable copy elements 420, with input ports A and B of each copy element 420 being connected to receive signals from different output ports C in the immediately preceding row of copy elements 420. When the designations i and j (where $1 \leq i \leq M$, $1 \leq j \leq N$) are applied to rows and columns, respectively, the interconnection of copy elements 420 within the array of FIG. 7 is defined by the equations $$B_{i,j} = C_{i-1,j} \text{ and}$$

$$A_{i,j} = C_{i-1, j-k}$$

where $k = 2^{i-1}$ and connections of ports A to undefined ports C are zero (e.g., $C_{2,-3}$ is outside the subscript limits and, therefore, $A_{3,1} = 0$). In the above definition with reference to FIG. 7, i is counted from the top and j is counted from the left.

When copy element 420 receives signal packets at its A and B inputs, it takes one of the following three actions:

(1) when the A input packet is a broadcaster (condition 00) and the B input packet is a blank packet (condition 10)—element 420 copies the data field of the A input packet into the data field of the B input packet, converts the no longer blank packet to a broadcaster packet, and transfers the altered packet to its output, C.

(2) when the A input packet is a private original (condition 01) or a blank packet that has been denied permission to copy (condition 11), and the B input packet is a blank packet (condition 10)—element 420 converts the blank B input packet to a blank packet that has been denied permission to copy and transfers the altered packet to its output, C; and (3) for all other input conditions element 420 transfers the B input packet, unaltered, to its output C.

Figure 8:
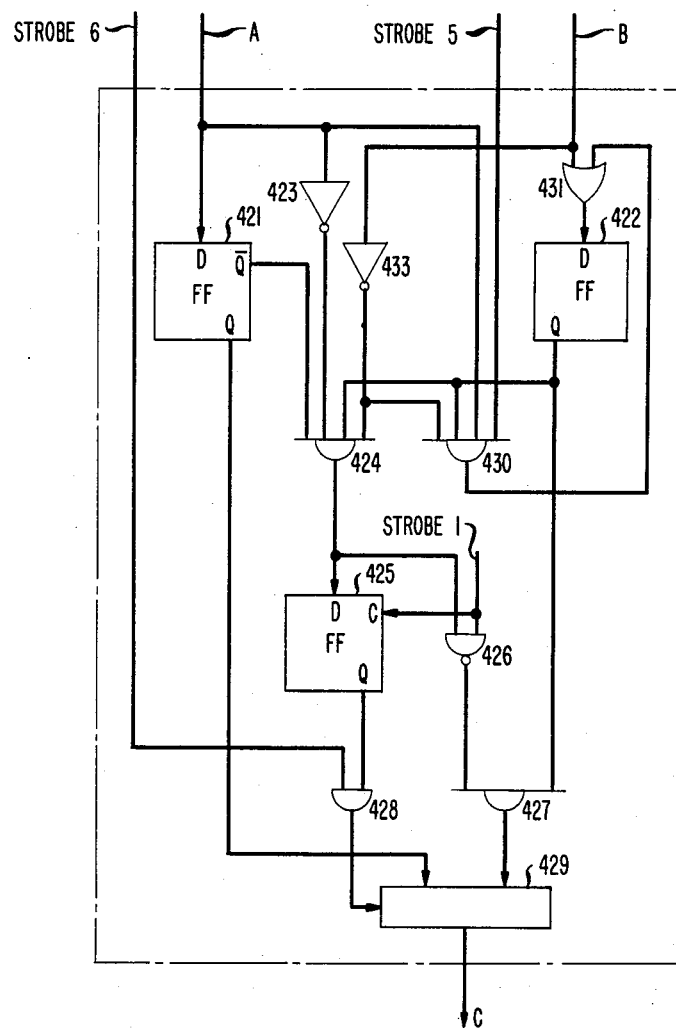
FIG. 8 presents the structure of copy elements 420.

FIG. 8 depicts one embodiment of switchable copy element 420. Flip-flop 421 is connected to input A directly and flip-flop 422 is connected to input B through OR gate 431. Flip-flops 421 and 422 allow for simultaneous evaluation of the copy permission bits and the broadcast bits of signal packets at inputs A and B. Inverter 423 connected to input A and inverter 433 connected to input B apply their signals to AND gate 424. AND gate 424 is also responsive to the $\overline{Q}$ output of flip-flop 421 and to the Q output of flip-flop 422. The output of gate 424, which is high only when A has condition 00 and B has condition 01, is connected to NAND gate 426 and to flip-flop 425. Both flip-flop 425 and gate 426 are activated with a strobe 5 control signal which is high when the broadcast bits are in flip-flops 421 and 422 and the output of gate 424 is valid. Gate 426 is connected to AND gate 427 which is also connected to the Q output of flip-flop 422. The action of gates 426 and 427 converts B input packets, when conditions are right, to broadcast packets.

To "copy" the information, flip-flop 425 is connected to AND gate 428, which is also connected to a strobe 6 control signal, and gate 428 is connected to the control input of selector 429. The input signals of selector 429 are derived from the Q output of flip-flop 421 (the A input signal) and from gate 427 (the B input signal). Strobe 6 control signal, which is high when the data fields are at the selector's, combines with the state of flip-flop 425 to place, when conditions are right, the A input data field information into the B input data field.

To modify the condition of blank packets that are being denied permission to copy, AND gate 430 is connected to strobe 5 control signal, to the Q output of flip-flop 422, to gate 433, and to the signal of port A. The output signal of gate 430 is applied to OR gate 431 where it modifies the copy permission bit of the B input copy signal packets when conditions so require.

FIG. 8 illustrates the operation of the FIG. 6 copy network by way of a specific example. The upper number associated with each signal line is the identification bit, and the lower number is the copy permission bit. The heavy lines trace the path of the data field to each output of network 40.

It may be observed in FIG. 8 that outputs 1, 2 and 3 (j=1,2 and 3) of network 40 receive their data from input 1 of network 40; outputs 4, 5, 6 and 7 receive their data from input 4; and outputs 8 through 12 receive their data from their respective inputs even though inputs 9, 11 and 12 are blank copy packets that wish to copy inputs 8 and 10, respectively. Not only is copying denied in the first row because both input 8 and input 10 do not wish to be copied (possess a "1" copy permission bit), but copying (of a distant broadcaster) is denied in subsequent rows because the copy permission bit of the blank copy packet has been changed to a "1".

One of the advantages of the FIG. 6 system is the simplicity with which broadcasting is accomplished. One disadvantage is the need for users who receive broadcasts to continually transmit blank copy packets.

Figure 10:
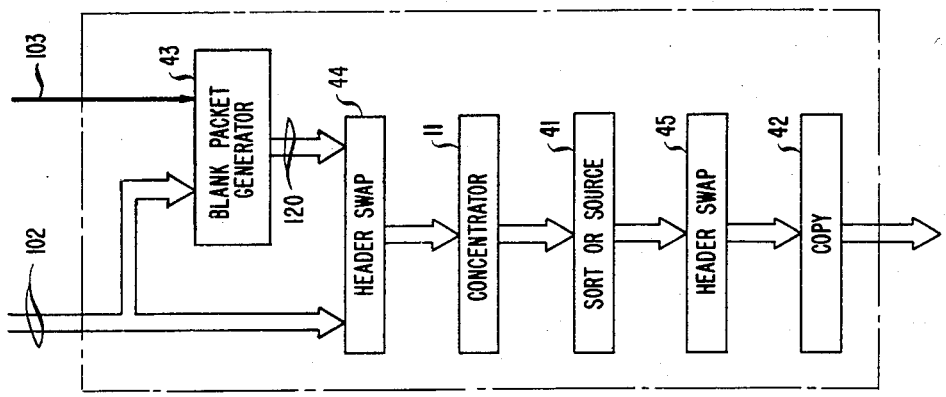
FIG. 10 depicts a modified broadcast network 40 with a blank packet generator 43.

This disadvantage is overcome, and additional advantages accrue, when broadcast network 40 is modified as shown in FIG. 10. The modified broadcast network has a separate blank copy packet generator 43 which in response to command signals on lines 102 or on a specified line 103 generates appropriately addressed blank copy packets and feeds them to concentrator 11 via lines 120. Blank packet generator 43, when it is responsive to line 103, may be viewed as an end user of the system of FIG. 6. The task of this end user is to generate blank copy packets. With such an arrangement, users that wish to affect the generation of blank copy packets each send a signal packet to this end user and the information in the data fields of those packets instructs the blank copy packet generator. Since the requests can come from hopeful receivers of broadcasts, from broadcasters, or even from third parties, this approach offers great flexibility in implementing, keeping track of, and charging for broadcasts.

One disadvantage in using a line 103 to instruct the blank copy packet generator is the possible bottleneck that might result in applications where many users wish to communicate with generator 43 simultaneously. This disadvantage disappears when lines 102 are connected to generator 43 directly, permitting full access to generator 43 by all users.

The exact embodiment of blank copy packet generator 43 depends on the sophistication which one wishes it to possess. In its most general form when designed to respond to signals on a line 103, generator 43 is programmable and may be realized with a microprocessor as described below. When designed to respond to lines 102, generator 43 is a collection of individual blank copy packet generators 44; each responsive to a line 102 and delivering blank copy packets on a line 120 to header swap memory 44.

Figure 11:
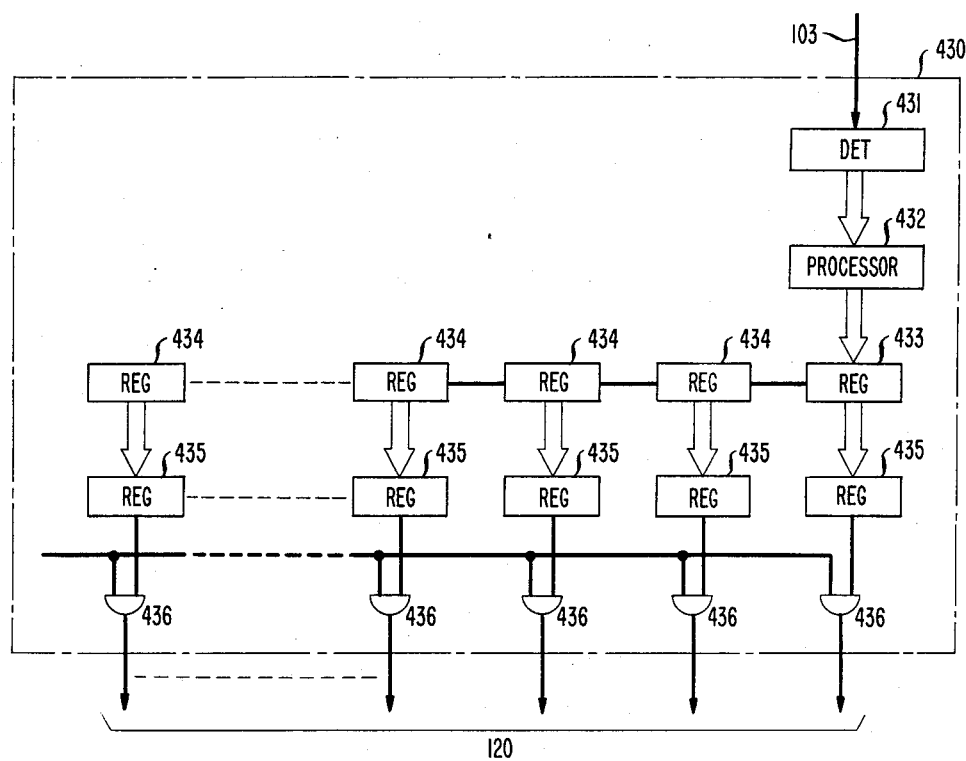
FIG. 11 details the structure of an illustrative embodiment blank packet generator 43 which employs a general purpose microprocessor 432.

FIG. 11 depicts a blank packet generator 43 responsive to a line 103 which feeds register 431. Processor 432 reads the signals in register 431, processes the information contained in the signals and develops blank copy packet templates which are accepted by register 433 and shifted, serially, to registers 434. The blank packet templates within registers 433 and 434 are repeatedly copied into registers 435 and shifted onto lines 120 through AND gates 436. Gates 436 disable the output signals during the data field portion of the packets to insure a blank data field and to permit loading of registers 435 with new information without affecting the signals at lines 120. The number of registers 435 (and lines 120) is a design choice but, obviously, it should not be greater than the number of user channels that can possibly request broadcasts.

The basic task of processor 432 is to maintain an updated list of the requests for blank copy packets. To maintain that list, processor 432 has an associated memory in which a table (size P, where P is the number of registers 435) of the various requests for blank packets is stored. To add a request, processor 432 merely adds an entry to the table. To delete a request, processor 432 searches the table for the request and deletes that entry.

FIG. 12 presents a flow chart which describes the table updating process. Processor 432 first initializes the necessary variables in section 500. It then waits in section 501 for a new request by monitoring the activity bit of register 431. When a new packet is discovered, processor 432 proceeds to section 502 in which it determines whether the request is an addition or a deletion. If the request is an addition, section 503 adds a new template to the table. If the request is a deletion, section 504 searches for the item in the table and section 505 deletes the item from the table. The algorithms for adding and deleting items from tables or queues are covered in great detail in "The Art of Computer Programming," Vol. 1, "Fundamental Algorithms" by Donald Knuth (Addison-Wesley Publishing Co.). After the new request has been processed, section 506 uses the new table to update registers 433 and 434. When the registers have been updated, processor 432 returns to section 501 to wait for a new request packet to arrive.

Figure 13:
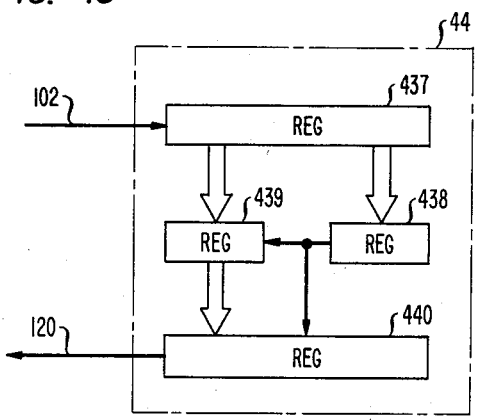
FIG. 13 presents one realization for an individual blank packet generator 44 responsive to line 102.

FIG. 13 depicts one embodiment of individual blank copy packet generator 44 which is responsive to signals on a line 102 and provides blank copy packets on a line 120. Register 437 stores each packet flowing through line 102 to switch 10 and detector 438 determines whether the packet is a request to begin or end the generation of blank copy packets. The information for detector 438 may be in the data field of the packets or in the header. We feel that a good choice is to use the broadcast and copy permission bits in the header to indicate a request to begin generation of packets (e.g., with a condition 10) and a request to end generation of packets (e.g., with a condition 11). Register 439 captures the information needed for generation of blank copy packets under control of detector 438 (e.g., source address and destination address) and register 440 correctly formats this information and repeatedly duplicates the information in register 439 and shifts it out onto line 120.

Control Block 50

Because of the self-routing architecture of the systems described above, control block 50 needs to provide very few control signals. The needed control signals for each one of the networks can be generated in a separate circuit and the circuits can be activated in a pipe-line fashion, with each network "telling" the next network when a new packet begins.

Each circuit is very conventional in design, including primarily a tapped shift register for propagating a one clock period pulse which marks the header's beginning. Most control signals, being one clock period long, are obtained by simply accessing the appropriate shift register taps. Each longer duration control signal is obtained with a flip-flop which is set with the signal at one tap of the shift register and reset with the signal at another tap of the shift register.

What is claimed is:

1. A non-blocking wide bandwidth system for connecting a plurality of incoming signal lines (100) to a plurality of outgoing signal lines (110), each of said incoming lines carrying time multiplexed signals and each of said signals having a characteristic bandwidth and a destination address accompanying its data, said system comprising:

a demultiplexer (101) connected to each of said incoming lines and demultiplexing said time multiplexed signals to form an alterable plurality of signal channels, each having the same preselected bandwidth;

a non-blocking space division switch (10) having switch input and output ports and responsive to said signal channels of said demultiplexers applied to said switch input ports, for simultaneously switching the signal of each of said signal channels to a switch output port which is related to said destination address accompanying the data of said signal; and a plurality of multiplexers (104), each multiplexing the signals of a chosen number of said switch output ports onto one of said outgoing signal lines.

2. The system of claim 1 wherein said switch comprises:

a sorting network (12) responsive to said signal channels of said multiplexers for simultaneously sorting the signals of said signal channels based on said destination addresses; and an expander (13) responsive to said sorting network for simultaneously steering output signals of said sorting network to said switch output ports based on said destination addresses.

3. The system of claim 1 wherein said switch comprises:

a concentrator (11), responsive to said signal channels of said demultiplexers, for simultaneously steering those signals of said signal channels which are active to adjacent output lines of said concentrator;

a sorting network (12) responsive to said output lines of said concentrator for simultaneously sorting the signals applied to said sorting network based on said destination addresses; and an expander (13), responsive to said sorting network, for simultaneously steering the output signals of said sorting network to said switch output ports based on said destination addresses.

4. A non-blocking wide bandwidth system for connecting a plurality of incoming signal lines (120) to a plurality of outgoing signal lines (110), each of said incoming lines carrying time multiplexed signals and each of said signals having a characteristic bandwidth and a destination address accompanying its data, said system comprising:

a demultiplexer block (20) connected to said incoming lines and demultiplexing said time multiplexed signals to form plurality of signal channels of a preselected bandwidth;

a non-blocking space division switch (10) having switch input and output ports and responsive to said signal channels of said demultiplexers applied to said switch input ports, for simultaneously switching the signal of each of said signal channels to a switch output port which corresponds to said destination address accompanying the data of said signal; and multiplexer block (30) for simultaneously and separately multiplexing the signals of chosen groups of said switch output ports to form a plurality of multiplexed signals and applying each said multiplexed signal onto one of said outgoing signal lines.

5. The system of claim 1 wherein said time multiplexed signals comprise signal packets having a header field and a data field, with said header field containing an activity bit to designate an active signal packet and a destination address subfield.

6. The system of claim 5 wherein said header further includes a source address subfield and a broadcast network (40) is interposed between said demultiplexers (101) and said switch (10) to copy the information in the data field of broadcast packets into the data fields of blank packets having the same source address.

7. The system of claim 6 wherein said broadcast network comprises:

a sorting network (41) responsive to input signals applied to said broadcast network for sorting said applied input signals based on said source addresses; and a copy network (42) for copying the information in the data fields of broadcast packets into the data field of blank packets having the same source address.

8. The system of claim 6 wherein said broadcast network comprises:

a concentrator (11) responsive to said signal channels for simultaneously steering those signals of said signal channels which are active to adjacent output ports of said concentrator;

a first memory (44) responsive to said outputs of said concentrator for modifying the format of each of said signal packets by placing said source address subfield before said destination address subfield;

a sorting network (41) connected to said first memory for sorting the signals applied to said sorting network based on said source addresses;

a second memory (45), responsive to said sorting network, for reversing the actions of said first memory; and a copy network (42), responsive to said second memory, for copying the information in the data fields of broadcast packets into the data field of blank packets having the same source address.

9. The system of claim 8 further comprising a blank packet generator (43) for generating blank packets and applying said blank packets to said concentrator.

10. The system of claim 8 further comprising a blank packet generator (43) responsive to a selected outgoing line of said system for generating blank packets and applying said blank packets to said concentrator.

11. The system of claim 8 further comprising a blank packet generator (43) responsive to said signal channels of said demultiplexers for generating blank packets and applying said blank packets to said concentrator.

* * * * *

UNITED STATES PATENT AND TRADEMARK OFFICE
CERTIFICATE OF CORRECTION

PATENT NO. : 4,542,497

DATED : September 17, 1985

INVENTOR(S) : Alan Huang, Scott C. Knauer

It is certified that error appears in the above-identified patent and that said Letters Patent is hereby corrected as shown below:

Column 12, line 10, after "selector's" insert --inputs--.

Signed and Sealed this

Eighteenth Day of February 1986

[SEAL]

Attest:

DONALD J. QUIGG

Attesting Officer

Commissioner of Patents and Trademarks